US011606443B1

(12) United States Patent
Liu et al.

(10) Patent No.: US 11,606,443 B1
(45) Date of Patent: Mar. 14, 2023

(54) READ-TIME RELEVANCE-BASED UNSEEN NOTIFICATION HANDLING

(71) Applicant: Microsoft Technology Licensing, LLC, Redmond, WA (US)

(72) Inventors: David Benjamin Liu, Santa Clara, CA (US); Rakesh Malladi, San Jose, CA (US); Swetha Nagabhushan Karthik, San Jose, CA (US); Gargi Harish Bhandari, San Jose, CA (US); Ajith Muralidharan, Sunnyvale, CA (US); Ruiqi Wang, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/559,654

(22) Filed: Dec. 22, 2021

(51) Int. Cl.
  *H04L 67/55* (2022.01)
  *G06F 9/54* (2006.01)
  *G06F 16/2455* (2019.01)
  *G06K 9/62* (2022.01)

(52) U.S. Cl.
  CPC .............. *H04L 67/55* (2022.05); *G06F 9/547* (2013.01); *G06F 16/24556* (2019.01); *G06K 9/6215* (2013.01); *G06K 9/6256* (2013.01)

(58) Field of Classification Search
  CPC .... G06F 9/542; G06F 9/547; G06F 16/24556; G06K 9/6215; G06K 9/6256; H04L 51/224; H04L 51/234; H04L 67/55
  See application file for complete search history.

(56) References Cited

U.S. PATENT DOCUMENTS

| 10,572,842 B1* | 2/2020 | To ........................... G06Q 30/00 |
| 2010/0281409 A1* | 11/2010 | Rainisto .................. G06F 9/451 715/767 |
| 2012/0072844 A1* | 3/2012 | Lefrancois des Courtis ............... G06Q 30/02 709/204 |
| 2014/0129661 A1* | 5/2014 | Thyagaraja ........... H04L 51/224 709/207 |
| 2016/0014057 A1* | 1/2016 | Gudla ..................... H04L 67/55 709/206 |

(Continued)

OTHER PUBLICATIONS

"Compare-and-swap", Retrieved from: https://en.wikipedia.org/wiki/Compare-and-swap, Oct. 16, 2021, 7 Pages.

(Continued)

*Primary Examiner* — Jeong S Park
(74) *Attorney, Agent, or Firm* — Nicholson De Vos Webster & Elliott LLP

(57) ABSTRACT

Technologies for unseen notification handling are described. Embodiments select an initial set of notifications, provide the selected initial set of notifications to a client device, store seen notifications in a first data store, maintain sent but unseen notifications in a second data store that is an in-memory online data store, retrieve a set of the sent but unseen notifications from the second data store, create a list of unseen notifications by combining the retrieved set of sent but unseen notifications with a set of unsent and unseen notifications, generate a set of relevance scores for the list of unseen notifications, create a new version of the list of unseen notifications based on the new set of relevance scores, and provide the new version of the list of the unseen notifications to the client device.

20 Claims, 7 Drawing Sheets

(56) References Cited

U.S. PATENT DOCUMENTS

2018/0129371 A1* 5/2018 Fowler ............. G06Q 10/06314
2018/0246971 A1* 8/2018 DeJohn, III ........... G06Q 10/10
2020/0169520 A1* 5/2020 Kunnath ............... H04L 67/565

OTHER PUBLICATIONS

"Concurrent Document Mutations", Retrieved from: https://docs.couchbase.com/java-sdk/2.7/concurrent-mutations-cluster.html#pessimistic-locking, Sep. 20, 2020, 8 Pages.

"Cross Data Center Replication (XDCR)", Retrieved from: https://web.archive.org/web/20210227033410/https://docs.couchbase.com/server/current/learn/clusters-and-availability/xdcr-overview.html, Feb. 27, 2021, 12 pages.

"CRUD Document Operations Using the Java SDK with Couchbase Server", Retrieved from: https://docs.couchbase.com/java-sdk/2.7/document-operations.html, Jul. 14, 2019, 16 Pages.

Watts, Stephen, "ACID Explained: Atomic, Consistent, Isolated & Durable", Retrieved from: https://www.bmc.com/blogs/acid-atomic-consistent-isolated-durable/#, Apr. 24, 2020, 16 Pages.

"Interface Bucket", Retrieved from: https://docs.couchbase.com/sdk-api/couchbase-java-client-2.7.19/com/couchbase/client/java/Bucket.html#getAndLock(D,int), Retrieved Date: Dec. 20, 2021, 138 Pages.

Shi, et al., "Air Traffic Controller: Member-First Notifications at LinkedIn", Retrieved from: https://engineering.linkedin.com/blog/2018/03/air-traffic-controller-member-first-notifications-at-linkedin, Mar. 1, 2018, 14 Pages.

* cited by examiner

FIG. 5A

502 An Initial Set Of Notifications Is Selected Based On An Initial Set Of Relevance Scores.

504 The Selected Initial Set Of Notifications Is Provided To A Client Device.

506 Seen Notifications Are Stored In A First Data Store.

508 Sent But Unseen Notifications Are Maintained In A Second Data Store.

510 A Set Of Sent But Unseen Notifications Is Retrieved From The Second Data Store.

512 A List Of Unseen Notifications Is Created.

514 A New Set Of Relevance Scores Is Generated For The List Of Unseen Notifications.

516 A New Version Of The List Of Unseen Notifications Is Created Based On The New Set Of Relevance Scores.

518 Responsive To An Online Trigger Event, The New Version Of The List Of Unseen Notifications Is Provided To A Client Device.

READ-TIME RELEVANCE-BASED UNSEEN NOTIFICATION HANDLING

TECHNICAL FIELD

A technical field to which the present disclosure relates is the automated transmission of digital notifications. Another technical field to which this disclosure relates is the automated creation and modification of lists of unseen notifications.

BACKGROUND

Online systems can act as routers for digital notifications. Digital notifications generated and/or received by an online system can be selectively transmitted by the online system over one or more networks to computing devices of users of the online system, where the users view the notifications through a user interface; for example, a front-end or client portion of the online system. Once sent to a user computing device, the notifications can be persisted in a notifications list on the client device for a period of time and then automatically removed from the notification list after the period of time has expired.

BRIEF DESCRIPTION OF THE DRAWINGS

FIG. 5A and FIG. 5B are flow diagrams of example methods for processing notifications in accordance with some embodiments of the present disclosure.

DETAILED DESCRIPTION

Figure 1:
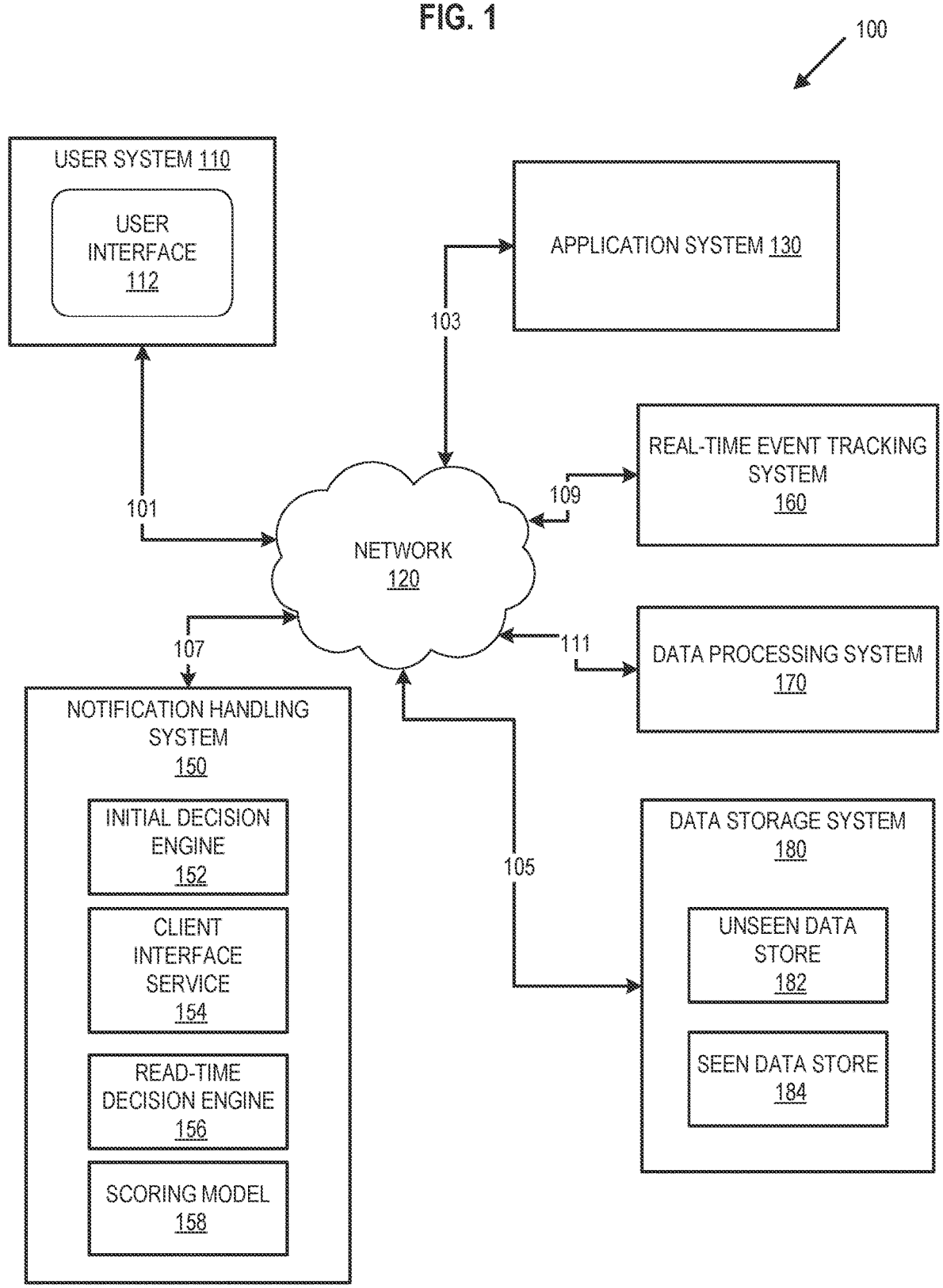
FIG. 1 illustrates an example computing system that includes a notification handling system in accordance with some embodiments of the present disclosure.

In online systems, different types of notifications include email, text messages, push notifications, and in-app notifications. Push notifications are short notification messages that the user sees on a mobile device without opening any app. For example, push notifications are displayed on a home screen or lock screen of a mobile device.

Email, text messages, and in-app notifications are considered pull notifications because the user does not see them until the user opens the associated application. In-app notifications differ from email and text messages in some ways. Email and text messages are specifically addressed by a particular sender to a particular recipient. For example, email and text messaging apps deliver all messages that identify a particular recipient address as the recipient to the email or text message inbox of that recipient. In contrast, with in-app notifications, the online system determines whether or not to deliver a particular notification to a particular user's in-app notification inbox. For example, the online system may apply an algorithm and/or programming logic to route notifications to some users but not others based on features of the notifications and/or the user's historical activities in the online system.

Another difference between email and text message inboxes and in-app notification inboxes is that the size of email and text message inboxes is generally not constrained. In contrast, the number of in-app notifications that are persisted in a user's in-app notification inbox is generally constrained by design and/or implementation requirements of the online system.

Still another difference between email and text message inboxes and in-app notification inboxes is that once an email or text message is sent, it cannot be retracted. This is also true for push notifications. In contrast, since the decision as to which in-app notifications are to be sent to a user's device is made by the online system, an online system configured with the disclosed technologies can determine to retract, remove, replace, or reorder notifications in the user's in-app notification inbox. Using the disclosed technologies, unseen notifications do not need to be finalized until the user actually visits the in-app notification part of the online system. Also, already-persisted in-app notifications can be removed, replaced, bumped up or down in the user's in-app notification inbox without the user noticing, using the disclosed technologies.

The characteristics and constraints of the in-app notification inbox present technical challenges for optimizing the handling of in-app notifications and personalizing the handling of in-app notifications for specific users of an online system. Other systems persist both seen and unseen notifications in the same data store, and select and order notifications based on recency. A shortcoming of recency-based systems is that older but important or highly relevant notifications may be superseded by more recent but less important or less relevant notifications. Also, if a user has not accessed their in-app notification inbox in some time, a large number of unseen notifications can accumulate such that important or highly relevant notifications may be overlooked because they are positioned at the bottom of the notification list.

Another shortcoming of other systems is that relevance determinations are performed offline or nearline, not in real time. As a result, other systems are unable to incorporate very recent user activity data into relevance determinations. Accordingly, these other systems are not able to modify or reorder unseen notification lists in real time, e.g., in response to an online trigger event such as a user accessing a notifications tab on a user interface. These shortcomings of other systems can lead to less than optimal or "stale" notification lists in the user's inbox.

Aspects of the present disclosure address the above technical challenges and/or other deficiencies of other approaches to improve the handling of the in-app notification inbox. As described in more detail below, embodiments store and manage sent but unseen notifications separately from seen notifications so that the unseen notifications are accessible at read time, e.g., in response to an online trigger. Embodiments are capable of retrieving sent but unseen notifications periodically or responsive to an online trigger event, such as a user visiting an in-app notifications tab. Embodiments create a list of unseen notifications that includes one or more of the retrieved sent but unseen notifications, periodically or responsive to an online trigger event. Embodiments generate a new set of relevance scores for the list of unseen notifications periodically or responsive to an online trigger event. Embodiments create a new version of the list of unseen notifications based on the new set of relevance scores. Responsive to an online trigger event received from a client device, embodiments provide the new version of the list of the unseen notifications to an in-app notification inbox of the client device.

The disclosed technologies are described with reference to an example use case of in-app notifications. However, aspects of the disclosed technologies are not limited to in-app notifications, but can be used to improve the handling of other forms of notification mechanisms or a combination of multiple different notification mechanisms.

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates an example computing system 100 that includes a notification handling system 150. In the embodiment of FIG. 1, computing system 100 includes a user system 110, a network 120, an application system 130, notification handling system 150, real-time event tracking system 160, data processing system 170, and data storage system 180.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 is or includes a front-end portion of application system 130, which may be implemented as a native application on a computing device or as a web application that launches in a web browser.

User interface 112 is any type of user interface as described above. User interface 112 can be manipulated by a user to input, upload, or share data, data records, and digital content items and/or to view or otherwise perceive data, data records, and digital content items distributed by application system 130. For example, user interface 112 can include a graphical user interface, haptic interface, and/or a conversational voice/speech interface that includes one or more mechanisms for viewing and manipulating digital content items.

Application system 130 is any type of application software system that includes or utilizes functionality provided by notification handling system 150. Examples of application system 130 include but are not limited to connections network software, such as professional and/or general social media platforms, and systems that are or are not be based on connections network software, such as digital content distribution services, general-purpose search engines, job search software, recruiter search software, sales assistance software, advertising software, learning and education software, messaging software, e-commerce software, or any combination of any of the foregoing.

The notification handling system 150 of FIG. 1 includes an initial decision engine 152, a client interface service 154, a read-time decision engine 156, and a scoring model 158. In other implementations, initial decision engine 152 and read-time decision engine 156 are combined into one component.

Initial decision engine 152 applies scoring model 158 to an initial set of incoming notifications from various notification providers. Examples of notification providers include different services within application system 130, such as people you may know, jobs you may be interested in, content shared by your connection, courses you may be interested in. Other examples of notification providers include external systems such as news services.

Scoring model 158 generates initial relevance scores for each of the individual notification items in the initial set. Initial decision engine 152 applies a label to each notification in the initial set based on the relevance scores. Examples of labels applied by initial decision engine 152 to notifications include SEND, ENQUEUE, and DROP. Notifications with a label of DROP are removed from the initial set and are not sent to the client device. Notifications with a label of SEND are routed to client interface service 154. Notifications with a label of ENQUEUE are added to a queue for possible later sending to the client device.

Client interface service 154, also known as a notification service, handles communications between notification handling system 150 and particular client devices. For example, client interface service 154 sends notifications with a label of SEND to one or more client devices in accordance with user identifiers associated with the SEND labels. Client interface service 154 keeps track of the number of unseen notifications in the in-app notification inbox, also known as the badge count, for each user of application system 130.

Client interface service 154 marks sent notifications as seen or unseen. and keeps track of which notifications are seen and which notifications are unseen. Client interface service 154 stores seen and unseen notifications in different data stores. Client interface service 154 keeps track of the last access time for each user, where the last access time is the date/timestamp of the last time the user visited the in-app notification inbox, in some embodiments, and uses the last access time to determine which sent notification items are seen and unseen. In some embodiments, all notifications persisted in a user's in-app notification inbox are marked as seen in response to the user having visited an in-app notifications tab.

Read-time decision engine 156 applies a scoring model 158 to unseen notifications periodically or in response to an online trigger, such as a user visit to an in-app notifications tab. In some embodiments, the scoring model used by read-time decision engine 156 is the same scoring model used by initial decision engine 152. In other embodiments, read-time decision engine 156 uses a different scoring model than the scoring model used by initial decision engine 152.

Read-time decision engine 156 applies a label to each unseen notification in the set based on new relevance scores generated by the scoring model used by read-time decision engine 156. Examples of labels applied by read-time decision engine 156 to notifications include SEND, REQUEUE, and DROP. Notifications with a label of DROP are removed from the unseen notifications and are not re-sent to the client device. Notifications with a label of SEND are routed to client interface service 154. Notifications with a label of REQUEUE are returned to the queue that holds notifications for possible later sending to the client device. In this way, notifications that have been sent to a client device previously can be retracted and either dropped or requeued. Notifications that have been dropped or requeued can be replaced by other notifications, such as other sent but unseen notifications, unsent and unseen notifications (e.g., queued notifications), and/or seen notifications.

Scoring model 158 includes one or more trained machine learning models used by initial decision engine 152 and/or read-time decision engine 156 to rank notifications based on relevance to a particular user of application system 130. Scoring model 158 is trained on training data that includes features that have been extracted or derived from, for example, user activity data collected by application system 130. For example, a user's historical activity data with respect to different notifications presented in the user's in-app notification inbox is used to train scoring model 158, in some embodiments. As such, scoring model 158 is personalized for a particular user, in some embodiments. In some embodiments, notification handling system 150 generates output that is used to train or retrain scoring model 158.

A machine learning model such as scoring model 158 is, in some embodiments, a combination of data and computer code that reflects relationships between sets of inputs and the outputs produced by the application of a machine learning algorithm to those sets of inputs. After a machine learning model has been trained, these relationships between inputs and outputs are reflected in the values of the machine learning algorithm parameters and/or coefficients. For example, application of a machine learning algorithm to training data adjusts the values of machine learning model parameters and/or coefficients iteratively until parameter and/or coefficient values are found that produce statistically reliable output, e.g., predictions, classifications, inferences, or scores. A loss function is used to compute model error (e.g., a comparison of model-generated values to validated or ground-truth values) at an iteration, in order to determine whether the model is producing reliable output or whether to adjust any parameter values and/or coefficient values.

Machine learning algorithm can refer to a single algorithm applied to a single set of inputs, multiple iterations of the same algorithm on different inputs, or a combination of different algorithms applied to different inputs. For example, in a neural network, a node corresponds to an algorithm that is executed on one or more inputs to the node to produce one or more outputs. A group of nodes each executing the same algorithm on a different input of the same set of inputs can be referred to as a layer of a neural network. The outputs of a neural network layer or a portion of a layer can constitute the inputs to another layer or portion of a layer of the neural network. A neural network can include an input layer that receives and operates on one or more raw inputs and passes output to one or more hidden layers, and an output layer that receives and operates on outputs produced by the one or more hidden layers to produce a final output.

The selection of machine learning algorithm, loss function, and associated parameter and/or coefficient values can be dependent on the requirements of the particular application system; e.g., the type of output desired to be produced and the nature of the inputs. For purposes of this disclosure, notification handling system 150 is agnostic as to the type and configuration of any particular scoring model 158.

Figure 6:
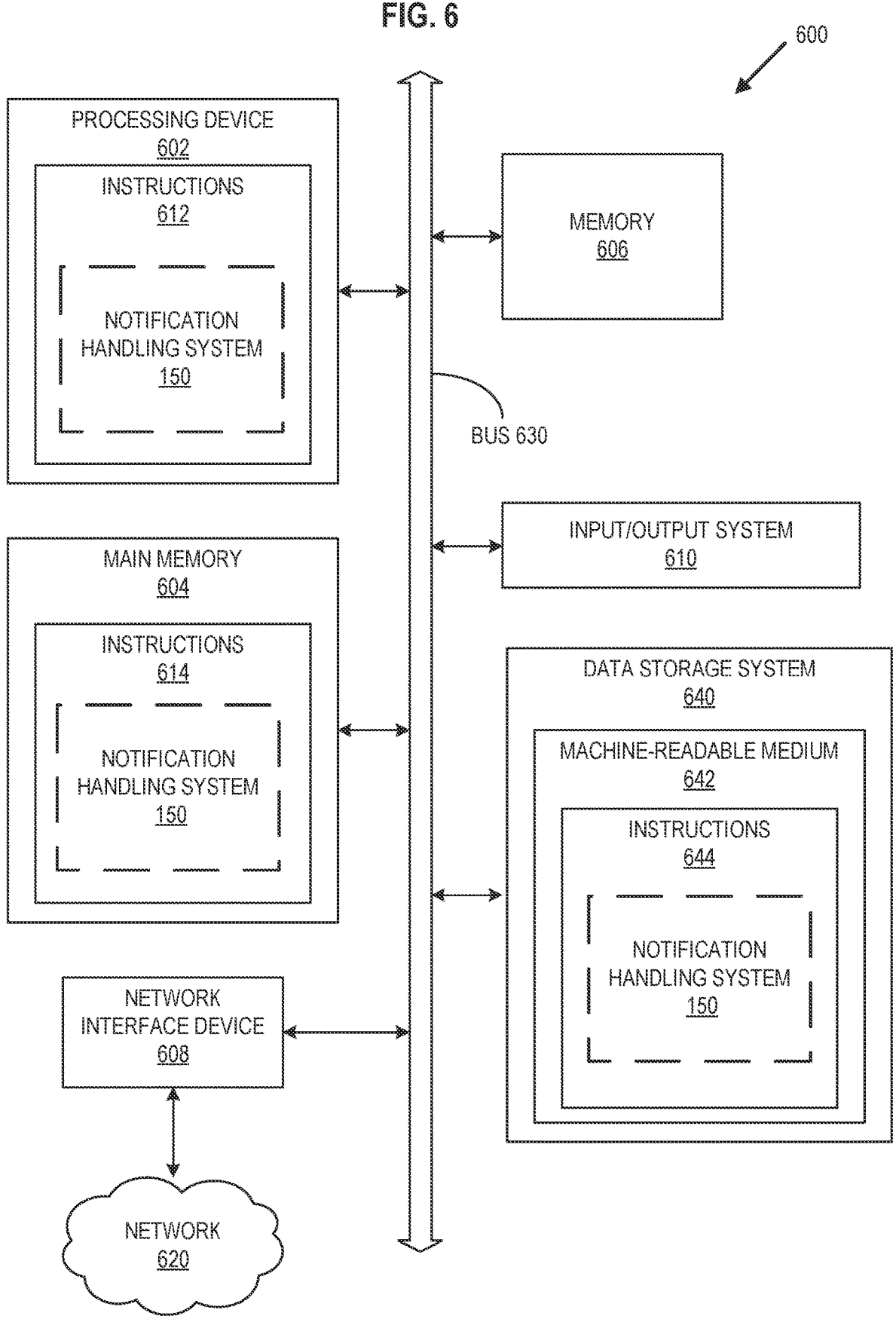
FIG. 6 is a block diagram of an example computer system in which embodiments of the present disclosure can operate.

Additional description of the various components of notification handling system 150 is provided below. In some implementations, application system 130 includes at least a portion of notification handling system 150. As shown in FIG. 6, described below, embodiments of notification handling system 150 are implemented as instructions stored in a memory, and a processing device 602 is configured to execute the instructions stored in the memory to perform the operations described herein.

Real-time event tracking system 160 captures user interface events such as page loads and clicks in real time, and formulates the user interface events into a data stream that can be consumed by, for example, a stream processing system. For example, when a user of application system 130 clicks on a user interface control such as view, comment, share, like, or loads a web page, etc., real-time event tracking system 160 fires an event to capture the user's identifier, the event type, the date/timestamp at which the user activity occurred, and possibly other information about the user interface event, such as the impression portal and/or the impression channel involved in the user interface event. Real-time event tracking system 160 generates a data stream that includes one record of real-time event data for each user interface event that has occurred. Real-time event tracking system 160 is implemented using APACHE KAFKA in some embodiments.

"Time" as used in the context of terminology such as real-time, near real-time, and offline, can refer to the time delay introduced by the use of computer technology, e.g., by automated data processing and/or network transmission, where the time delay is the difference in time as measured by a system clock, between the occurrence of an online event and the use of data processed in response to the event, such as for display, feedback, and/or control purposes.

Data processing system 170 includes mechanisms for real-time data processing, near real-time processing, and batch processing, in some embodiments. Real-time data processing involves a continual input, such as a live feed, immediate, constant processing of the data stream, and steady output in response to the continual input. Real-time data processing involves low-latency messaging and event processing. An example of real-time data processing is data streaming, where the streaming data is not persisted for further analysis. In real-time data processing, the acceptable processing time is seconds, sub-seconds or less (e.g., milliseconds). An example of a tool that can be used for real-time data processing is APACHE SAMZA.

In contrast to real-time processing, near real-time data processing persists the incoming data and then processes the data. An example of a use of near real-time data processing is to combine data from multiple different data sources, for example to detect patterns or anomalies in the data. Examples of near real-time processing include processing sensor data, network monitoring, and online transaction processing. In near real-time data processing, the acceptable processing time is in the range of minutes or seconds. An example of a tool that can be used for near real-time, asynchronous data processing is APACHE SAMZA.

Offline or batch data processing is less time-sensitive than near real-time or real-time processing. In batch data processing, the acceptable processing time is in the range of days or hours. An example of a tool that can be used for batch data processing is APACHE HADOOP.

Data storage system 180 includes data stores and/or data services that store digital content items, data received, used, manipulated, and produced by application system 130, and data received, used, manipulated, and produced by notification handling system 150. For example, data storage system 180 includes an unseen data store 182 and a seen data store 184.

Unseen data store 182 stores sent but unseen notification items. In some embodiments, unseen data store 182 is implemented as an online, in-memory data store such as COUCHBASE. Seen data store 184 stores seen notification items. In some embodiments, seen data store 182 is implemented as an online, searchable data store that is not an in-memory data store. For example, seen data store 184 is implemented using a data storage system that has secondary indexing capabilities, in some embodiments.

In some embodiments, data storage system 180 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine.

Data stores of data storage system 180 can be configured to store data produced by real-time, near real-time (also referred to as nearline), and/or offline (e.g., batch) data processing. A data store configured for real-time data processing can be referred to as a real-time data store. A data store configured for near real-time data processing can be referred to as a near real-time data store or nearline data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 180 resides on at least one persistent and/or volatile storage device that can reside within the same local network as at least one other device of computing system 100 and/or in a network that is remote relative to at least one other device of computing system 100. Thus, although depicted as being included in computing system 100, portions of data storage system 180 can be part of computing system 100 or accessed by computing system 100 over a network, such as network 120.

Any of user system 110, application system 130, notification handling system 150, real-time event tracking system 160, data processing system 170, and/or data storage system 180 includes an interface embodied as computer programming code stored in computer memory that when executed causes a computing device to enable bidirectional communication with any other of user system 110, application system 130, notification handling system 150, real-time event tracking system 160, data processing system 170, and/or data storage system 180 using communicative coupling mechanisms 101, 103, 105, 107, 109, 111. Examples of communicative coupling mechanisms include network interfaces, inter-process communication (IPC) interfaces and application program interfaces (APIs).

In some embodiments, a client portion of application system 130 operates in user system 110, for example as a plugin or widget in a graphical user interface of a software application or as a web browser executing user interface 112. In an embodiment, a web browser transmits an HTTP request over a network (e.g., the Internet) in response to user input that is received through a user interface provided by the web application and displayed through the web browser. A server running application system 130 and/or a server portion of application system 130 receives the input, performs at least one operation using the input, and returns output using an HTTP response that the web browser receives and processes.

Other technologies that can be used to effectuate communications of data and instructions between any of user system 110, application system 130, notification handling system 150, real-time event tracking system 160, data processing system 170, and/or data storage system 180 include application programming interfaces (APIs) such as REST (representational state transfer) APIs and SOAP (simple object access protocol), scripting languages such as JavaScript, markup languages such as XML (extensible markup language) and JSON (JavaScript object notation), and AJAX (asynchronous JavaScript and XML).

Each of user system 110, application system 130, notification handling system 150, real-time event tracking system 160, data processing system 170, and/or data storage system 180 is implemented using at least one computing device that is communicatively coupled to electronic communications network 120 using communicative coupling mechanisms 101, 103, 105, 107, 109, 111. Any of user system 110, application system 130, notification handling system 150, real-time event tracking system 160, data processing system 170, and/or data storage system 180 are bidirectionally communicatively coupled by network 120. User system 110 as well as one or more different user systems (not shown) are bidirectionally communicatively coupled to application system 130 while application system 130 is accessed by a user of user system 110.

A typical user of user system 110 is an administrator or an end user of application system 130 and/or notification handling system 150. An administrator or an end user can be a human person or a computer program designed to simulate human use of application system 130, such as a bot. User system 110 is configured to communicate bidirectionally with any of user system 110, application system 130, notification handling system 150, real-time event tracking system 160, data processing system 170, and/or data storage system 180 over network 120 using communicative coupling mechanism 101. User system 110 has at least one address that identifies user system 110 to network 120 and/or application system 130; for example, an IP (internet protocol) address, a device identifier, a MAC (media access control) address, a session identifier, a user account identifier, or any combination of any of the foregoing.

The features and functionality of user system 110, application system 130, notification handling system 150, real-time event tracking system 160, data processing system 170, and/or data storage system 180 are implemented using computer software, hardware, or software and hardware, and can include combinations of automated functionality, data structures, and digital data, which are represented schematically in the figures. User system 110, application system 130, notification handling system 150, real-time event tracking system 160, data processing system 170, and/or data storage system 180 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 120 is implemented on any medium or mechanism that provides for the exchange of data, signals, and/or instructions between the various components of computing system 100. For example, data and instructions can be represented as signals, where a signal includes a series of bits, and a bit value corresponds to a designated level of electrical charge that can traverse network 120 and be received and processed by devices on network 120. Examples of network 120 include, without limitation, a Local Area Network (LAN), a Wide Area Network (WAN), an Ethernet network, the Internet, at least one terrestrial, satellite or wireless link, or a combination of any number of different networks and/or communication links.

Figure 2:
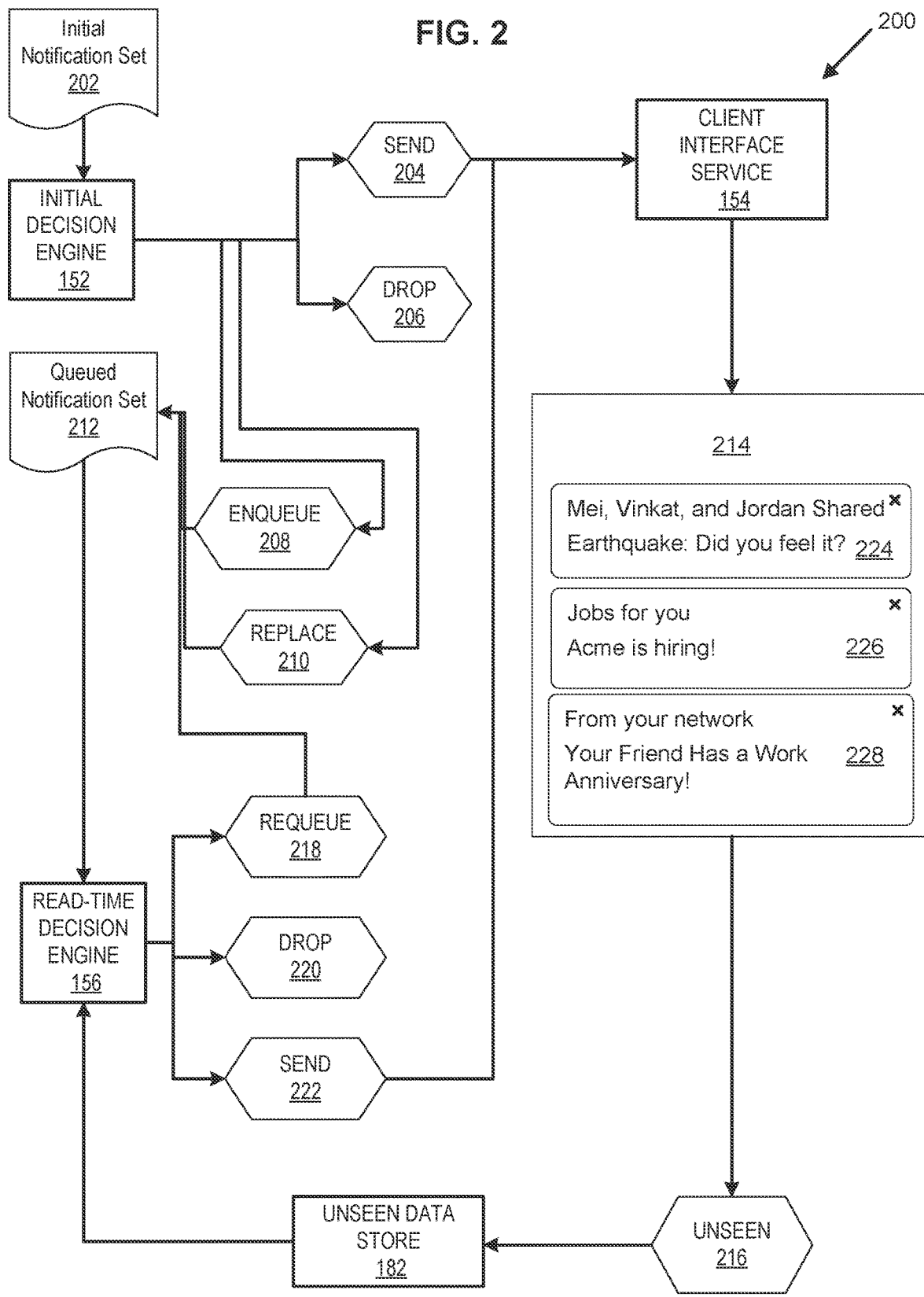
FIG. 2 is a module-based flow diagram showing aspects of processing notifications in accordance with some embodiments of the present disclosure.

FIG. 2 is a module-based flow diagram showing aspects of processing notifications in accordance with some embodiments of the present disclosure.

The method 200 is performed by processing logic that can include hardware (e.g., processing device, circuitry, dedicated logic, programmable logic, microcode, hardware of a device, integrated circuit, etc.), software (e.g., instructions run or executed on a processing device), or a combination thereof In some embodiments, portions of the method 200 are performed by the application system 130 and/or the notification handling system 150 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In FIG. 2, an initial notification set 202 is received and processed by initial decision engine 152. For example, initial decision engine 152 applies scoring model 158 to each notification item in initial notification set 202. Based on the output of scoring model 158, initial decision engine 152 assigns a label to each notification item in initial notification set 202. Examples of possible labels assigned by initial decision engine 152 to notification items of initial notification set 202 include send 204, drop 206, enqueue 208, and replace 210.

Notification items labeled send are routed to client interface service 154. Notification items labeled drop are not routed to client interface service 154 but are deleted from initial notification set 202, and, in some cases, also removed from the set of training data used to train the scoring model. Notification items labeled enqueue are added to queued notification set 212 but not routed to client interface service 154. Notifications labeled replace are also added to queued notification set 212.

Client interface service 154 sends notification items of initial notification set 202 that have been labeled by initial decision engine 152 as SEND to a client device associated with a particular user identifier. Notification items labeled SEND, e.g., notification items 224, 226, 228, are persisted in an in-app notifications inbox such as inbox 214. Notification items 224, 226, 228 are marked as unseen 216 by client interface service 154 until the user's next login or visit to the inbox, for example. Unseen notifications are stored in unseen data store 182.

Read-time decision engine 156 periodically or responsive to an online trigger retrieves sent but unseen notifications from unseen data store 182 and, in some embodiments, unsent and unseen notifications from queued notification set 212. Read-time decision engine 156 applies a scoring model to each notification item in the list of unseen notifications that includes sent but unseen notifications and may also include unsent and unseen notifications. Based on the new relevance scores generated by the scoring model for the unseen notifications, read-time decision engine 156 assigns a new label to each unseen notification in the list. Examples of possible labels assigned by read-time decision engine 156 to the unseen notification items include requeue 218, drop 220, and send 222. Unseen notification items labeled SEND by read-time decision engine 156 are routed to client interface service 154 for further processing and sending to a client device, as described above. Unseen notification items labeled DROP by read-time decision engine 156 are removed from the list of unseen notifications and also, potentially, removed from training data used to train the scoring model. Unseen notification items labeled REQUEUE by read-time decision engine 156 are added to queued notification set 212. In this way, the notifications list in inbox 214 can be periodically modified or reordered based on the labels applied by read-time decision engine 156 to the unseen notifications. For example, a sent but unseen notification can be dropped and replaced with a different notification. Alternatively or in addition, a sent but unseen notification can be requeued and replaced with another notification. Still additionally or alternatively, a sent but unseen notification can be resent but placed at a different position in the notification list of inbox 214.

Figure 3:
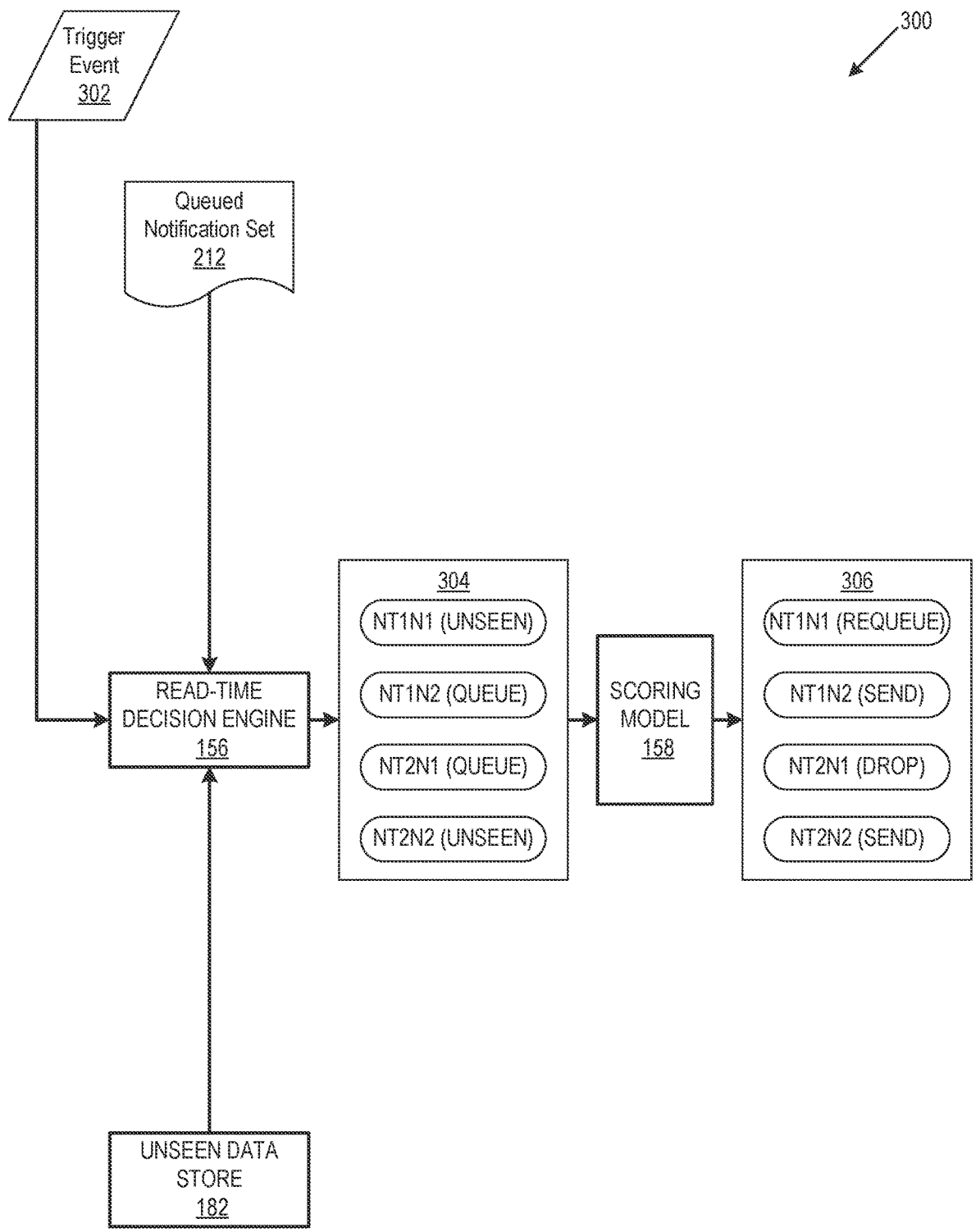
FIG. 3 is another module-based flow diagram showing aspects of processing notifications in accordance with some embodiments of the present disclosure.

FIG. 3 is another module-based flow diagram showing aspects of processing notifications in accordance with some embodiments of the present disclosure.

The method 300 is performed by processing logic that can include hardware (e.g., processing device, circuitry, dedicated logic, programmable logic, microcode, hardware of a device, integrated circuit, etc.), software (e.g., instructions run or executed on a processing device), or a combination thereof In some embodiments, portions of the method 200 are performed by the application system 130 and/or the notification handling system 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In the example of FIG. 3, operation of read-time decision engine 156 is responsive to a trigger event 302. Examples of trigger event 302 include an expiration of a time interval or an occurrence of a particular date or time. That is, in some embodiments, read-time decision engine 156 is re-run periodically, e.g., on a schedule, in order to re-optimize a user's in-app notification inbox on a regular basis, in anticipation of the user's next login or visit to the notifications page of application 130. Other examples of trigger event 302 include a user's login or visit to a notifications page or tab, e.g., a visit to an in-app notifications inbox. As such, read-time decision engine 156 is capable of running periodically, responsive to an online trigger event, or both periodically and in response to an online trigger event such as a user interaction with a notifications interface of application system 130.

Responsive to trigger event 302, read-time decision engine 156 retrieves a set of sent but unseen notifications from unseen data store 182 and retrieves a set of unsent and unseen notifications from scheduled notification set 212. Notifications list 304 shows an example of a combined notification list that may be generated by read-time decision engine 156. List 304 includes two notifications of a first notification type NT1 and two notifications of a second notification type NT2. One notification of each notification type has been retrieved from queued notification set 212 (i.e., NT1N2 and NT2N1 are both labeled QUEUE). Also, one notification of each notification type has been retrieved from unseen data store 182 (i.e., NT1N1 and NT2N2 are both labeled UNSEEN).

Read-time decision engine 156 applies scoring model 158 to each notification item in list 304. Based on the relevance scores output by scoring model 158, read-time decision engine 156 generates a new version 306 of list 304, in which the labels for the notification items have been modified as a result of the newly generated relevance scores. For example, notification NT1N1 was previously sent to the client device but will be requeued and not resent to the client device as a result of the newly generated relevance scores. Notification NT1N2 was previously unsent and unseen but will be sent to the client device. Notification NT2N1 was previously unsent and unseen but will be dropped. Notification NT2N2 was previously send and unseen and will be resent to the client device.

Figure 4:
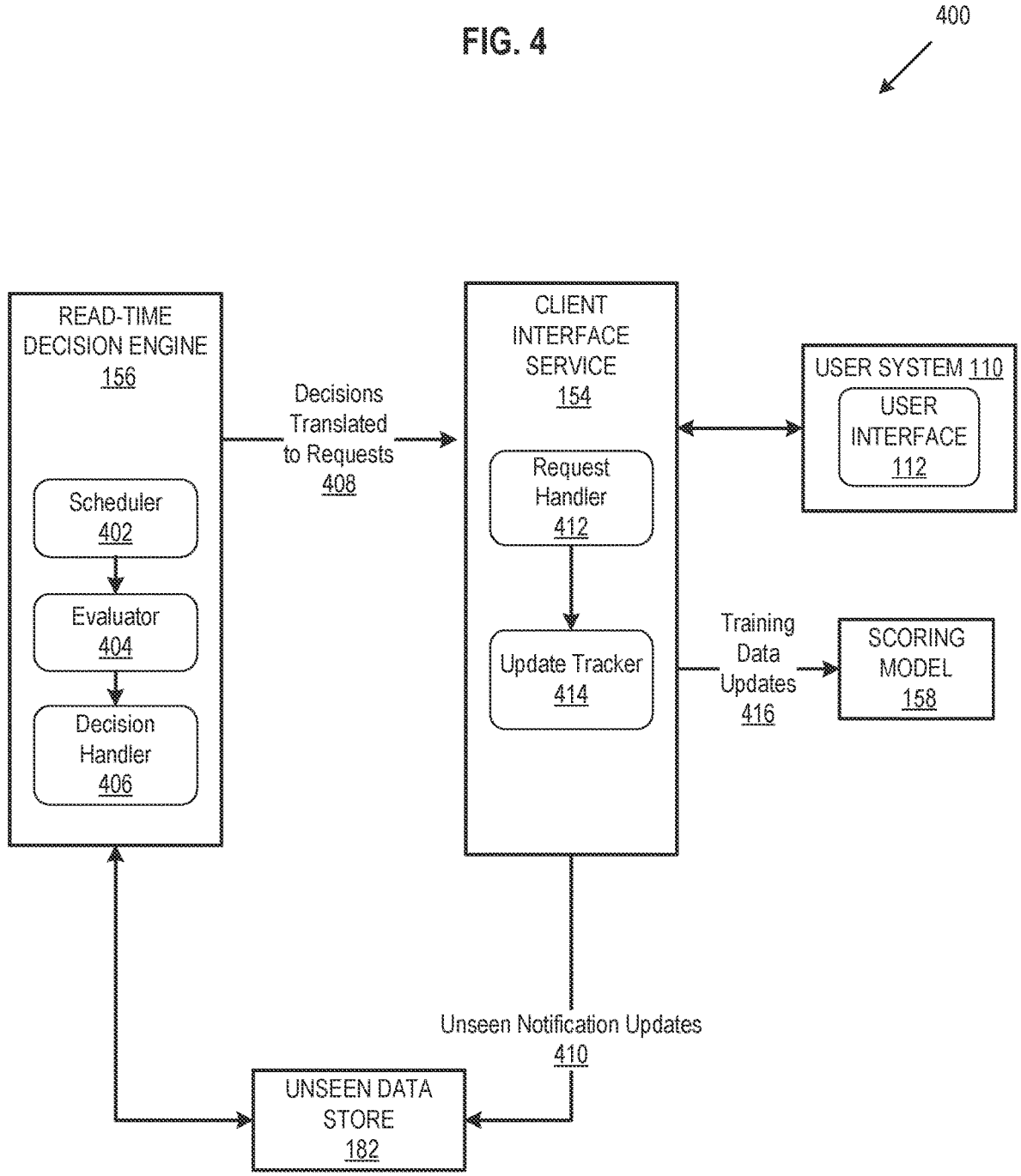
FIG. 4 is another module-based flow diagram showing aspects of processing notifications in accordance with some embodiments of the present disclosure.

FIG. 4 is another module-based flow diagram showing aspects of processing notifications in accordance with some embodiments of the present disclosure.

The method 400 is performed by processing logic that can include hardware (e.g., processing device, circuitry, dedicated logic, programmable logic, microcode, hardware of a device, integrated circuit, etc.), software (e.g., instructions run or executed on a processing device), or a combination thereof In some embodiments, the method 400 is performed by the notification handling system 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In FIG. 4, read-time decision engine 156 includes a scheduler 402, an evaluator 404, and a decision handler 406.

Scheduler 402 schedules a user of application system 130 for evaluation by read-time decision engine 156. That is, scheduler 402 determines a schedule according to which the unseen notifications in each particular user's in-app notification inbox are to be re-scored by a scoring model for relevance to that particular user, and initiates evaluator 404 according to the determined schedule. For example, scheduler 402 initiates evaluator 404 every N hours, where N is a positive integer, and/or each time the user logs in to application system 130 or accesses a notifications screen of application system 130. Scheduler 402 tracks and maintains the schedule in a data store keyed by user identifier, in some embodiments.

Evaluator 404 is initiated periodically by scheduler 402. In response to being initiated, evaluator 404 fetches the current inventory of sent but unseen notifications from unseen data store 182 and also, in some embodiments, fetches the current inventory of unsent and unseen notifications from the queued notification set 212. In some embodiments, evaluator 404 combines the fetched sent but unseen notifications with the unsent and unseen notifications into an unseen notification list; for example by merging the fetched data sets. In other embodiments; for example in embodiments where a queued notification set 212 is not maintained, i.e., notifications are only either sent or dropped but not queued, the unseen notification list contains only sent but unseen notifications.

Evaluator 404 applies one or more scoring models to the list of unseen notifications produced from unseen data store 182 and, optionally, queued notification set 212. The one or more scoring models applied by evaluator 404 to the list of unseen notifications generates, for each notification item in the list of unseen notifications, a new relevance score. The new relevance score has a different value or the same value as the relevance score that may have been generated earlier for the same notification item by initial decision engine 152.

Based on the new relevance scores generated by applying the one or more scoring models to the unseen notifications, evaluator 404 determines a new list of unseen notifications. The new list of unseen notifications is a modified or reordered version of the list of unseen notifications. For example, the new list of unseen notifications includes some but not all of the sent but unseen notification items in the unseen notification list. That is, a previously sent but unseen notification could be replaced by another sent but unseen notification or by an unsent and unseen notification from queued notification set 212. The new list of unseen notifications produced by evaluator 404 is provided or made available to decision handler 406 for further processing.

Decision handler 406 translates the evaluation decisions, i.e., the new list of unseen notifications produced by evaluator 404, into requests 408. Requests 408 are, for example, HTTP or REST-style requests that are capable of being read and processed by user interface 112 of user system 110. Decision handler 406 generates requests 408 only for modifications to the user's inbox 214, in some embodiments, such that only changes to inbox 214 are sent to user system 110. For example, requests 408 include a request to add a new in-app notification to inbox 214 and/or a request to re-rank an existing unseen in-app notification. In other embodiments, decision handler 406 generates requests 408 for the entire new list of unseen notifications, such that the entire modified list of unseen notifications is sent to user system 110 to replace the previously persisted list of unseen notifications in inbox 214 in its entirety.

Requests 408 generated by read-time decision engine 156 are provided to client interface service 154. In FIG. 4, client interface service 154 includes a request handler 412 and an update tracker 414.

At client interface service 154, request handler 412 receives requests 408 and communicates requests 408 to user system 110. Request handler 412 also receives communications from user system 110 in the form of HTTP or REST-style requests, for example. For instance, request handler 412 receives last access time data from user system 110, which client interface service 154 uses to mark notifications having a timestamp prior to the last access time as seen. Request handler 412 also receives user activity data from user system 110 indicating whether the user has interacted with any unseen notifications in inbox 214 during a given session.

Client interface service 154 provides unseen notification updates 410 to unseen data store 182 based on last access time data and/or user interface activity data received from user system 110. For example, previously unseen notifications that have now been marked seen are removed from unseen data store 182. As such, unseen data store 182 is updated periodically and responsive to user interface events, e.g., in response to evaluation decisions produced by read-time decision engine 156, last access data and/or user activity data. Thus, in contrast to other approaches in which updates produced by client interface service 154 are not available to or not incorporated into relevance determinations, the disclosed approaches using read-time decision engine 156 and unseen data store 182 are capable of updating relevance scores in real time and in response to updates produced by client interface service 154.

In embodiments where read-time decision engine 156 is scheduled to run on a time interval, client interface service 154 checks the freshness of each request 408 and voids requests 408 that were made before the user's last access time but arrived at client interface service 154 after the last access time. For example, each request 408 has an associated send timestamp that reflects the time that the request 408 was sent by read-time decision engine 156. Client interface service 154 compares the send timestamp of each request 408 to the user's last access time and also compares the time of arrival timestamp of each request 408 at client interface service 154 to the last access timestamp, to determine whether to service or void the request 408.

Update tracker 414 handles the deletion of unseen notifications where the deletion decision has been made by read-time decision engine 156. For example, update tracker 414 fires one or more tracking events to update unseen data store 182 and/or scoring model 158. For example, update tracker provides training data updates 416 to scoring model 158. Training data updates 416 include, for example, deletions and/or additions to the training data used to train scoring model 158 that are based on relevance evaluation decisions produced by read-time decision engine 156.

Figure 5B:
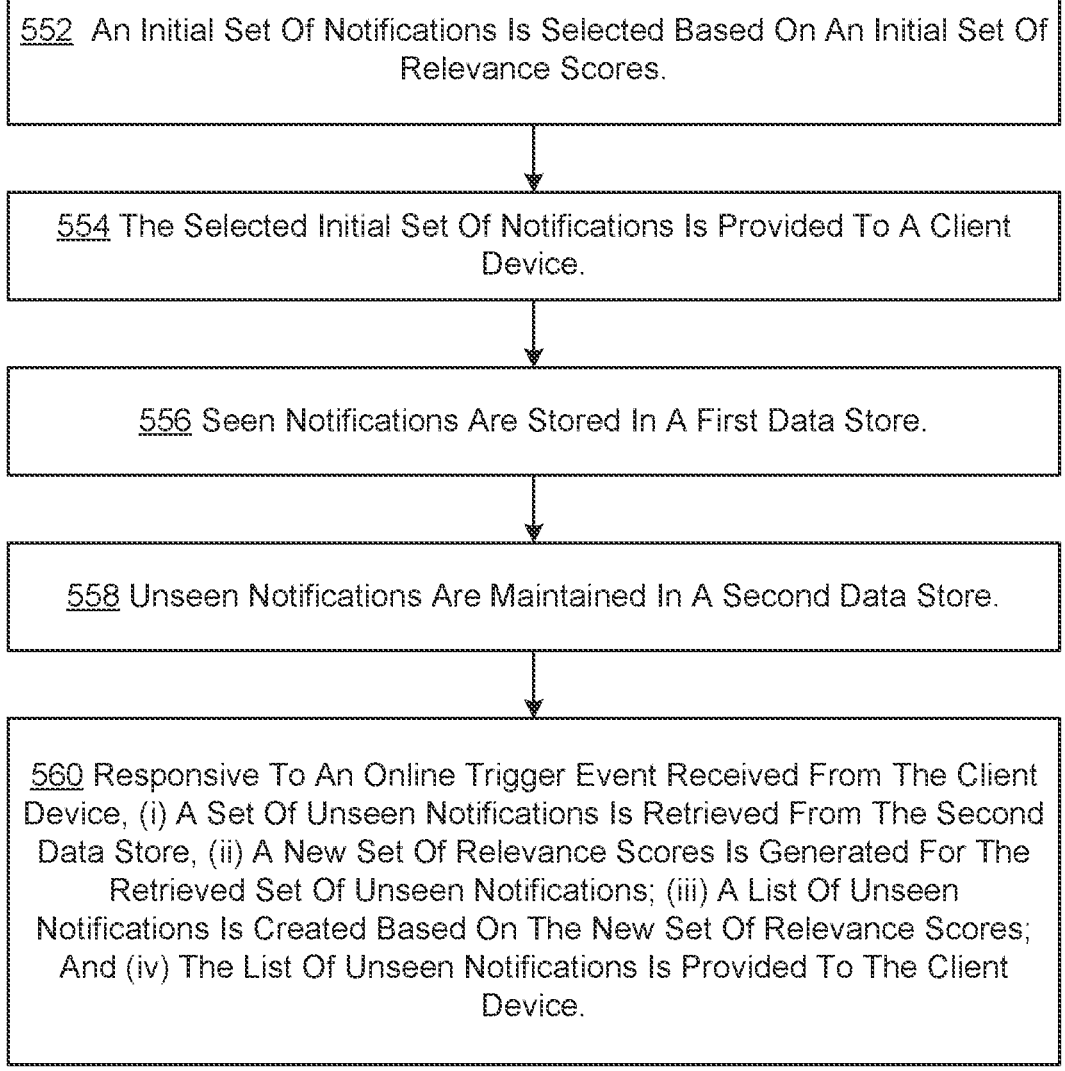

FIG. 5A and FIG. 5B are flow diagrams of example methods for processing notifications in accordance with some embodiments of the present disclosure.

The method 500 and the method 550 are performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, portions of the method 500 and/or the method 550 are performed by the application system 130 and/or the notification handling system 150 of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring to FIG. 5A, the method 500 includes storing unseen notifications separately from seen notifications, re-determining relevance for unseen notifications, and modifying a notification list based on the re-determined relevance scores at a trigger time. At operation 502, the processing device selects an initial set of notifications based on an initial set of relevance scores. At operation 504, the processing device provides the initial set of notifications selected at operation 502 to a client device. In some embodiments, operations 502 and 504 are performed by initial decision engine 152, described above.

At operation 506, the processing device stores seen notifications of the initial set of notifications in a first data store. For example, a seen notification identifier and a user identifier associated with the client device to which the initial set of notifications was provided in operation 504 are stored in the first data store. In some implementations, the first data store is an online data store but not an in-memory data store. An example of an online data store that is not an in-memory data store is a searchable online database. In some embodiments, the first data store is implemented as seen data store 184, described above.

At operation 508, the processing device maintains sent but unseen notifications of the initial set of notifications and the user identifier in a second data store. In some implementations, the second data store is an in-memory online data store. An example of an in-memory data store is a data store that does not provide secondary indexing capabilities. For example, the second data store is implemented using COUCHBASE, in some embodiments. the second data store is implemented as unseen data store 182.

At operation 510, the processing device retrieves a set of the sent but unseen notifications from the second data store. In some embodiments, the set of sent but unseen notifications is retrieved directly by a remote call, i.e., without the use of any secondary indexes.

At operation 512, the processing device creates a list of unseen notifications. In some implementations, the processing device combines the retrieved set of sent but unseen notifications with a set of unsent and unseen notifications. In some implementations, the processing device determines the sent but unseen notifications based on a last access time that is associated with both the user identifier associated with the client device at operation 506 and an in-app notification service. In some embodiments, operation 512 is performed by read-time decision engine 156, described above.

At operation 514, the processing device generates a new set of relevance scores for the list of unseen notifications. At operation 516, the processing device creates a new version of the list of unseen notifications based on the new set of relevance scores generated at operation 514. In some embodiments, one or more of operations 512, 514, and/or 516 are performed by read-time decision engine 156, described above.

In some implementations, based on the new set of relevance scores, the processing device aggregates at least two unseen notifications of a same notification type into an aggregated notification. For example, if multiple first-degree connections of a user have shared the same article, a single notification is created indicating that all of these first-degree connections have shared the article. In FIG. 2, notification 224 is an example of an aggregated notification. In some embodiments, the new set of relevance scores triggers the aggregation of notifications if the new relevance score for the article exceeds a threshold relevance value or is within the top k relevance values, where k is a positive integer that corresponds to a maximum badge count.

In some implementations, the processing device tracks a count of unseen notifications, also known as a badge count, and modifies the list of unseen notifications based on the count of unseen notifications. For example, based on the new relevance scores, an unseen notification is removed and replaced with a different notification rather than being repositioned, because repositioning the notification would cause the maximum badge count to be exceeded. Thus, in some implementations, responsive to the online trigger event and based on the new set of relevance scores, the processing device replaces, in the new version of the list of unseen notifications, at least one sent but unseen notification with, for example, at least one unsent and unseen notification.

In some implementations, responsive to the online trigger event and based on the new set of relevance scores, the processing device replaces, in the new version of the list of unseen notifications, for example, at least one unsent and unseen notification with at least one sent but unseen notification. In some implementations, responsive to the online trigger event and based on the new set of relevance scores, the processing device replaces, in the new version of the list of unseen notifications, for example, at least one sent but unseen notification with a different at least one sent but unseen notification.

In some implementations, responsive to the online trigger event and based on the new set of relevance scores, the processing device reorders the list of unseen notifications. In some implementations, the processing device adds a replaced at least one notification to a queue of scheduled notifications. In some implementations, the processing device removes a replaced at least one notification from training data for a scoring model based on the new set of relevance scores. In some implementations, the processing device moves a notification from the second data store to the first data store based on the new set of relevance scores.

At operation 518, responsive to an online trigger event received from the client device, the processing device provides the new version of the list of the unseen notifications to an in-app notification service of the client device. In some implementations, the online trigger event includes a user login and/or a user visit to an in-applications notifications tab of a user interface. In some embodiments, operation 518 is performed by client interface service 154, described above.

Referring to FIG. 5B, the method 550 differs from the method 550 in that the method 550 does not include combining sent but unseen notifications with unsent and unseen notifications. Also, in the method 550, more portions of the notification processing are performed in response to the online trigger event.

At operation 552, the processing device selects an initial set of notifications based on an initial set of relevance scores. In some embodiments, operation 518 is performed by initial decision engine 152, described above. At operation 554, the processing device provides the selected initial set of notifications to a client device. In some embodiments, operation 554 is performed by client interface service 154, described above.

At operation 556, the processing device stores seen notifications of the initial set of notifications and a user identifier associated with the client device in a first data store. In some implementations, the first data store is an online data store but not an in-memory data store. In some implementations, the seen notifications are determined based on a last accessed time associated with the user identifier and an in-app notification service. In some embodiments, operation 556 is performed by client interface service 154, described above and the first data store is implemented as seen data store 184, described above.

At operation 558, the processing device maintains unseen notifications of the initial set of notifications and the user identifier associated with the client device at operation 556 in a second data store. In some implementations, the second data store is an in-memory online data store. In some embodiments, operation 556 is performed by client interface service 154, described above and the second data store is implemented as unseen data store 182, described above.

At operation 560, responsive to an online trigger event received from the client device, the processing device (i) retrieves a set of unseen notifications from the second data store, (ii) generates a new set of relevance scores for the unseen notifications in the retrieved set, (iii) creates a list of unseen notifications based on the new set of relevance scores, and (iv) provides the list of unseen notifications to the client device. In some embodiments, portions of operation 560 are performed by read-time decision engine 156 in communication with client interface service 154, as described above.

In some implementations, the online trigger event includes a user login and/or a user visit to a notifications screen of a user interface. In some implementations, the processing device tracks a count of unseen notifications, also known as a badge count, and, responsive to the creating of the list of unseen notifications, updates the count of unseen notifications.

In some implementations, responsive to the online trigger event and based on the new set of relevance scores, the processing device replaces, in the list of unseen notifications, at least one sent but unseen notification with at least one unsent and unseen notification. Alternatively, or in addition, responsive to the online trigger event and based on the new set of relevance scores, the processing device replaces, in the list of unseen notifications, at least one sent but unseen notification with a different at least one sent but unseen notification. Additionally, or alternatively, responsive to the online trigger event and based on the new set of relevance scores, the processing device replaces, in the list of unseen notifications, at least one unsent and unseen notification with at least one sent but unseen notification.

In some implementations, the processing device adds a replaced at least one sent but unseen notification to a queue of scheduled notifications. Alternatively, or in addition, the processing device removes a replaced at least one sent but unseen notification from training data for a scoring model. Additionally, or alternatively, responsive to the online trigger event and based on the new set of relevance scores, the processing device reorders the list of unseen notifications.

In some implementations, based on the new set of relevance scores, the processing device aggregates at least two unseen notifications of a same notification type into an aggregated notification. In some implementations, responsive to the providing of the list of unseen notifications to the client device, the processing device moves a notification from the second data store to the first data store.

FIG. 6 illustrates an example machine of a computer system 600 within which a set of instructions for causing the machine to perform any one or more of the methodologies discussed herein are executed. In some embodiments, the computer system 600 corresponds to a component of a networked computer system (e.g., the computer system 100 of FIG. 1) that includes, is coupled to, or utilizes a machine to execute an operating system to perform operations corresponding to the notification handling system 150 of FIG. 1.

The machine is connected (e.g., networked) to other machines in a local area network (LAN), an intranet, an extranet, and/or the Internet, in some embodiments. The machine operates in the capacity of a server or a client machine in a client-server network environment, as a peer machine in a peer-to-peer (or distributed) network environment, or as a server or a client machine in a cloud computing infrastructure or environment, in various embodiments.

The machine is a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random-access memory (DRAM) such as synchronous DRAM (SDRAM) or Rambus DRAM (RDRAM), etc.), a memory 606 (e.g., flash memory, static random-access memory (SRAM), etc.), an input/output system 610, and a data storage system 640, which communicate with each other via a bus 630.

The main memory 604 is configured to store instructions 614 for performing the operations and steps discussed herein. Instructions 614 include portions of notification handling system 150 when those portions of notification handling system 150 are stored in main memory 604. Thus, notification handling system 150 is shown in dashed lines as part of instructions 614 to illustrate that portions of notification handling system 150 can be stored in main memory 604. However, it is not required that notification handling system 150 be embodied entirely in instructions 614 at any given time and portions of notification handling system 150 can be stored in other components of computer system 600.

Processing device 602 represents one or more general-purpose processing devices such as a microprocessor, a central processing unit, or the like. Processing device 602 is a complex instruction set computing (CISC) microprocessor, reduced instruction set computing (RISC) microprocessor, very long instruction word (VLIW) microprocessor, or a processor implementing other instruction sets, or processors implementing a combination of instruction sets, in some embodiments. Alternatively, processing device 602 is one or more special-purpose processing devices such as an application specific integrated circuit (ASIC), a field programmable gate array (FPGA), a digital signal processor (DSP), network processor, or the like. The processing device 602 is configured to execute instructions 612 for performing the operations and steps discussed herein.

Instructions 612 include portions of notification handling system 150 when those portions of notification handling system 150 are being executed by processing device 602. Thus, similar to the description above, notification handling system 150 is shown in dashed lines as part of instructions 612 to illustrate that, at times, portions of notification handling system 150 are executed by processing device 602. For example, when at least some portion of notification handling system 150 is embodied in instructions to cause processing device 602 to perform the method(s) described above, some of those instructions can be read into processing device 602 (e.g., into an internal cache or other memory) from main memory 604 and/or data storage system 640. However, it is not required that all of notification handling system 150 be included in instructions 612 at the same time and portions of notification handling system 150 are stored in one or more other components of computer system 600 at other times, e.g., when one or more portions of notification handling system 150 are not being executed by processing device 602.

The computer system 600 can further include a network interface device 608 to communicate over the network 620. Network interface device 608 can provide a two-way data communication coupling to a network. For example, network interface device 608 can be an integrated-services digital network (ISDN) card, cable modem, satellite modem, or a modem to provide a data communication connection to a corresponding type of telephone line. As another example, network interface device 608 can be a local area network (LAN) card to provide a data communication connection to a compatible LAN. Wireless links can also be implemented. In any such implementation network interface device 608 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 600.

Computer system 600 can send messages and receive data, including program code, through the network(s) and network interface device 608. In the Internet example, a server can transmit a requested code for an application program through the Internet 628 and network interface device 608. The received code can be executed by processing device 602 as it is received, and/or stored in data storage system 640, or other non-volatile storage for later execution.

The input/output system 610 can include an output device, such as a display, for example a liquid crystal display (LCD) or a touchscreen display, for displaying information to a computer user, or a speaker, a haptic device, or another form of output device. The input/output system 610 can include an input device, for example, alphanumeric keys and other keys configured for communicating information and command selections to processing device 602. An input device can, alternatively or in addition, include a cursor control, such as a mouse, a trackball, or cursor direction keys for communicating direction information and command selections to processing device 602 and for controlling cursor movement on a display. An input device can, alternatively or in addition, include a microphone, a sensor, or an array of sensors, for communicating sensed information to processing device 602. Sensed information can include voice commands, audio signals, geographic location information, and/or digital imagery, for example.

The data storage system 640 can include a machine-readable storage medium 642 (also known as a computer-readable medium) on which is stored one or more sets of instructions 644 or software embodying any one or more of the methodologies or functions described herein. The instructions 644 can also reside, completely or at least partially, within the main memory 604 and/or within the processing device 602 at different times during execution thereof by the computer system 600, the main memory 604 and the processing device 602 also constituting machine-readable storage media.

In one embodiment, the instructions 644 include instructions to implement functionality corresponding to a feature generation component (e.g., the notification handling system 150 of FIG. 1). Notification handling system 150 is shown in dashed lines as part of instructions 644 to illustrate that, similar to the description above, portions of notification handling system 150 can be stored in data storage system 640 alternatively or in addition to being stored within other components of computer system 600.

Dashed lines are used in FIG. 6 to indicate that it is not required that notification handling system 150 be embodied entirely in instructions 612, 614, and 644 at the same time. In one example, portions of notification handling system 150 are embodied in instructions 644, which are read into main memory 604 as instructions 614, and portions of instructions 614 are read into processing device 602 as instructions 612 for execution. In another example, some portions of notification handling system 150 are embodied in instructions 644 while other portions are embodied in instructions 614 and still other portions are embodied in instructions 612.

While the machine-readable storage medium 642 is shown in an example embodiment to be a single medium, the term "machine-readable storage medium" should be taken to include a single medium or multiple media that store the one or more sets of instructions. The term "machine-readable storage medium" includes any medium that is capable of storing or encoding a set of instructions for execution by the machine and that cause the machine to perform any one or more of the methodologies of the present disclosure. The term "machine-readable storage medium" includes, but is not limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented methods and processes and implement the systems described above in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Additional illustrative examples of the technologies disclosed herein are provided below. An embodiment of the technologies may include any of the examples or a combination of the examples described below.

In some embodiments, unseen notifications are stored separately from seen notifications, relevance is re-determined for unseen notifications, a notification list is modified based on the new relevance scores computed at a trigger time.

In an example 1, a method incudes: selecting an initial set of notifications based on an initial set of relevance scores, providing the selected initial set of notifications to a client device, storing seen notifications of the initial set of notifications and a user identifier associated with the client device in a first data store that is an online data store but not an in-memory data store, maintaining sent but unseen notifications of the initial set of notifications and the user identifier in a second data store that is an in-memory online data store, retrieving a set of the sent but unseen notifications from the second data store, creating a list of unseen notifications by combining the retrieved set of sent but unseen notifications with a set of unsent and unseen notifications, generating a new set of relevance scores for the list of unseen notifications, creating a new version of the list of unseen notifications based on the new set of relevance scores, and responsive to an online trigger event received from the client device, providing the new version of the list of the unseen notifications to an in-app notification service of the client device.

An example 2 includes the subject matter of example 1, further including: responsive to the online trigger event and based on the new set of relevance scores, replacing, in the new version of the list of unseen notifications, at least one sent but unseen notification with at least one unsent and unseen notification. An example 3 includes the subject matter of example 1 or example 2, further including: responsive to the online trigger event and based on the new set of relevance scores, replacing, in the new version of the list of unseen notifications, at least one unsent and unseen notification with at least one sent but unseen notification. An example 4 includes the subject matter of any of examples 1-3, further including: responsive to the online trigger event and based on the new set of relevance scores, replacing, in the new version of the list of unseen notifications, at least one sent but unseen notification with a different at least one sent but unseen notification. An example 5 includes the subject matter of any of examples 1-4, further including: adding a replaced at least one notification to a queue of scheduled notifications. An example 6 includes the subject matter of any of examples 1-5, further including: removing a replaced at least one notification from training data for a scoring model. An example 7 includes the subject matter of any of examples 1-6, further including: based on the new set of relevance scores, aggregating at least two unseen notifications of a same notification type into an aggregated notification. An example 8 includes the subject matter of any of examples 1-7, further including: responsive to the online trigger event and based on the new set of relevance scores, reordering the list of unseen notifications. An example 9 includes the subject matter of any of examples 1-8, further including: determining the sent but unseen notifications based on a last access time associated with the user identifier and the in-app notification service. An example 10 includes the subject matter of any of examples 1-9, further including: tracking a count of unseen notifications; and modifying the list of unseen notifications based on the count of unseen notifications. An example 11 includes the subject matter of any of examples 1-10, where the online trigger event includes at least one of a user login and a user visit to an in-applications notifications tab of a user interface. An example 12 includes the subject matter of any of examples 1-11, further including: moving a notification from the second data store to the first data store.

In some embodiments, combining sent but unseen notifications with unsent and unseen notifications is not required. In some embodiments, unseen notifications are retrieved and processed in response to the online trigger.

In an example 13, a system, includes: at least one processor, memory coupled to the at least one processor, the memory stores instructions that when executed by the at least one processor cause the at least one processor to be capable of: selecting an initial set of notifications based on an initial set of relevance scores, providing the selected initial set of notifications to a client device, storing seen notifications of the initial set of notifications and a user identifier associated with the client device in a first data store that is an online data store but not an in-memory data store, maintaining unseen notifications of the initial set of notifications and the user identifier in a second data store that is an in-memory online data store, and responsive to an online trigger event received from the client device, (i) retrieving a set of unseen notifications from the second data store, (ii) generating a new set of relevance scores for the unseen notifications in the retrieved set, (iii) creating a list of unseen notifications based on the new set of relevance scores, and (iv) providing the list of unseen notifications to the client device.

An example 14 includes the subject matter of example 13, where the instructions, when executed by the at least one processor, further cause the at least one processor to be capable of: responsive to the online trigger event and based on the new set of relevance scores, replacing, in the list of unseen notifications, at least one sent but unseen notification with at least one unsent and unseen notification; or responsive to the online trigger event and based on the new set of relevance scores, replacing, in the list of unseen notifications, at least one sent but unseen notification with a different at least one sent but unseen notification; or responsive to the online trigger event and based on the new set of relevance scores, replacing, in the list of unseen notifications, at least one unsent and unseen notification with at least one sent but unseen notification. An example 15 includes the subject matter of example 13 or example 14, where the instructions, when executed by the at least one processor, further cause the at least one processor to be capable of: adding a replaced at least one sent but unseen notification to a queue of scheduled notifications; or removing a replaced at least one sent but unseen notification from training data for a scoring model. An example 16 includes the subject matter of any of examples 13-15, where the instructions, when executed by the at least one processor, further cause the at least one processor to be capable of: based on the new set of relevance scores, aggregating at least two unseen notifications of a same notification type into an aggregated notification; or responsive to the online trigger event and based on the new set of relevance scores, reordering the list of unseen notifications.

An example 17 includes the subject matter of any of examples 13-16, where the instructions, when executed by the at least one processor, further cause the at least one processor to be capable of: determining the seen notifications based on a last accessed time associated with the user identifier and an in-app notification service. An example 18 includes the subject matter of any of examples 13-17, where the instructions, when executed by the at least one processor, further cause the at least one processor to be capable of: tracking a count of unseen notifications; and responsive to the creating of the list of unseen notifications, updating the count of unseen notifications. An example 19 includes the subject matter of any of examples 13-18, where the online trigger event includes at least one of a user login and a user visit to a notifications screen of a user interface. An example 20 includes the subject matter of any of examples 13-19, where the instructions, when executed by the at least one processor, further cause the at least one processor to be capable of: responsive to the providing of the list of unseen notifications to the client device, moving a notification from the second data store to the first data store.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   selecting an initial set of notifications based on an initial set of relevance scores;
   providing the selected initial set of notifications to a client device;
   storing seen notifications of the initial set of notifications and a user identifier associated with the client device in a first data store that is an online data store but not an in-memory data store;
   maintaining sent but unseen notifications of the initial set of notifications and the user identifier in a second data store that is an in-memory online data store;
   retrieving a set of the sent but unseen notifications from the second data store;
   creating a list of unseen notifications by combining the retrieved set of sent but unseen notifications with a set of unsent and unseen notifications;
   generating a new set of relevance scores for the list of unseen notifications;
   creating a new version of the list of unseen notifications based on the new set of relevance scores; and responsive to an online trigger event received from the client device, providing the new version of the list of the unseen notifications to an in-app notification service of the client device.

2. The method of claim 1, further comprising:
responsive to the online trigger event and based on the new set of relevance scores, replacing, in the new version of the list of unseen notifications, at least one sent but unseen notification with at least one unsent and unseen notification.

3. The method of claim 1, further comprising:
responsive to the online trigger event and based on the new set of relevance scores, replacing, in the new version of the list of unseen notifications, at least one unsent and unseen notification with at least one sent but unseen notification.

4. The method of claim 1, further comprising:
responsive to the online trigger event and based on the new set of relevance scores, replacing, in the new version of the list of unseen notifications, at least one sent but unseen notification with a different at least one sent but unseen notification.

5. The method of claim 1, further comprising:
adding a replaced at least one notification to a queue of scheduled notifications.

6. The method of claim 1, further comprising:
removing a replaced at least one notification from training data for a scoring model.

7. The method of claim 1, further comprising:
based on the new set of relevance scores, aggregating at least two unseen notifications of a same notification type into an aggregated notification.

8. The method of claim 1, further comprising:
responsive to the online trigger event and based on the new set of relevance scores, reordering the list of unseen notifications.

9. The method of claim 1, further comprising:
determining the sent but unseen notifications based on a last access time associated with the user identifier and the in-app notification service.

10. The method of claim 1, further comprising:
tracking a count of unseen notifications; and
modifying the list of unseen notifications based on the count of unseen notifications.

11. The method of claim 1, wherein the online trigger event comprises at least one of a user login and a user visit to an in-applications notifications tab of a user interface.

12. The method of claim 1, further comprising:
moving a notification from the second data store to the first data store.

13. A system, comprising:
at least one processor;
memory coupled to the at least one processor;
the memory stores instructions that when executed by the at least one processor cause the at least one processor to be capable of:
selecting an initial set of notifications based on an initial set of relevance scores;
providing the selected initial set of notifications to a client device;
storing seen notifications of the initial set of notifications and a user identifier associated with the client device in a first data store that is an online data store but not an in-memory data store;
maintaining unseen notifications of the initial set of notifications and the user identifier in a second data store that is an in-memory online data store; and
responsive to an online trigger event received from the client device, (i) retrieving a set of unseen notifications from the second data store, (ii) generating a new set of relevance scores for the unseen notifications in the retrieved set, (iii) creating a list of unseen notifications based on the new set of relevance scores, and (iv) providing the list of unseen notifications to the client device.

14. The system of claim 13, wherein the instructions, when executed by the at least one processor, further cause the at least one processor to be capable of:
responsive to the online trigger event and based on the new set of relevance scores, replacing, in the list of unseen notifications, at least one sent but unseen notification with at least one unsent and unseen notification; or
responsive to the online trigger event and based on the new set of relevance scores, replacing, in the list of unseen notifications, at least one sent but unseen notification with a different at least one sent but unseen notification; or
responsive to the online trigger event and based on the new set of relevance scores, replacing, in the list of unseen notifications, at least one unsent and unseen notification with at least one sent but unseen notification.

15. The system of claim 13, wherein the instructions, when executed by the at least one processor, further cause the at least one processor to be capable of:
adding a replaced at least one sent but unseen notification to a queue of scheduled notifications; or
removing a replaced at least one sent but unseen notification from training data for a scoring model.

16. The system of claim 13, wherein the instructions, when executed by the at least one processor, further cause the at least one processor to be capable of:
based on the new set of relevance scores, aggregating at least two unseen notifications of a same notification type into an aggregated notification; or
responsive to the online trigger event and based on the new set of relevance scores, reordering the list of unseen notifications.

17. The system of claim 13, wherein the instructions, when executed by the at least one processor, further cause the at least one processor to be capable of:
determining the seen notifications based on a last accessed time associated with the user identifier and an in-app notification service.

18. The system of claim 13, wherein the instructions, when executed by the at least one processor, further cause the at least one processor to be capable of:
tracking a count of unseen notifications; and
responsive to the creating of the list of unseen notifications, updating the count of unseen notifications.

19. The system of claim 13, wherein the online trigger event comprises at least one of a user login and a user visit to a notifications screen of a user interface.

20. The system of claim 13, wherein the instructions, when executed by the at least one processor, further cause the at least one processor to be capable of:
responsive to the providing of the list of unseen notifications to the client device, moving a notification from the second data store to the first data store.

* * * * *